United States Statutory Invention Registration [19]

[11] Reg. Number: H648

Tran [43] Published: Jul. 4, 1989

[54] AIR PASSAGE DEVICE

[75] Inventor: Hein Tran, Seattle, Wash.

[73] Assignee: The United States of America as represented by the Secretary of the Air Force, Washington, D.C.

[21] Appl. No.: 231,291

[22] Filed: Aug. 12, 1988

[51] Int. Cl.[4] ..... B64D 15/04

[52] U.S. Cl. ..... 244/134 B; 244/53 B; 60/39.03

[58] Field of Search ..... 244/134 R, 134 B, 53 B, 244/53 R; 60/39.093

[56] References Cited

U.S. PATENT DOCUMENTS

| | | | |
|---|---|---|---|
| 1,932,681 | 10/1933 | Smith | 244/134 |
| 2,297,540 | 9/1942 | Driscoll | 244/134 |
| 2,447,095 | 8/1948 | Schmidt | 244/134 |
| 2,514,105 | 7/1950 | Thomas | 244/134 |
| 2,556,736 | 6/1951 | Palmatier | 244/134 |
| 3,566,606 | 3/1971 | Mortlock | 60/39.093 |
| 3,933,327 | 1/1976 | Cook et al. | 244/134 B |
| 4,674,714 | 6/1987 | Cole et al. | 244/134 B |
| 4,738,416 | 4/1988 | Birbragher | 244/134 B |

*Primary Examiner*—Deborah L. Kyle
*Assistant Examiner*—Michael J. Carone
*Attorney, Agent, or Firm*—Bobby D. Scearce; Donald J. Singer

[57] ABSTRACT

A bulkhead structure for separating two compartments in an aircraft engine inlet cowl or the like and for promoting fluid flow between the compartments is described which comprises a first flanged member having a first flange attached to the periphery of the bulkhead and a second flange having in a surface thereof a plurality of corrugations extending across the width of the second flange, and a second flanged member having a first flange presenting a first surface for attachment to the walls defining the compartments separated by the bulkhead and presenting a second surface attached to the second flange of the first flanged member for defining with the corrugations a corresponding plurality of passageways past the bulkhead at the periphery thereof.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR PASSAGE DEVICE

RIGHTS OF THE GOVERNMENT

The invention described herein may be manufactured and used by or for the Government of the United States for all governmental purposes without the payment of any royalty.

BACKGROUND OF THE INVENTION

The present invention relates to structures for conducting fluid flow past a bulkhead separating compartments in an aircraft, such as in the de-icing (or anti-icing) system of an aircraft engine inlet cowl or the like.

In certain types of conventional aircraft structures defining systems for preventing or removing ice accumulation from external surfaces of the aircraft, air heated by the engine(s) is directed against and along inner surfaces of the aircraft structure to be de-iced. Bulkhead structures separating compartments within the aircraft often interfere with smooth flow of heated air along the interior of surfaces to be de-iced. For example, in the housing structure of an engine inlet cowl in which the invention described herein is particularly applicable, heated air is directed against the inner surface of the leading edge, is conducted rearwardly along the inner surface of the cowling and through openings in the bulkhead separating the engine inlet cowl from the engine compartment, and is thereafter exhausted. In conventional structures, openings in the bulkhead for facilitating flow of air consist of drilled holes, cut-away slots or machined grooves, and procedures for fabricating these bulkheads reguire careful and time-consuming dressing of the edges of the holes to avoid crack formation and possible consequent structural failure of the airframe.

The invention solves or reduces in critical importance the problems in conventional aircraft structure as just defined by providing an edge attachment structure for joining a bulkhead or like structure to the walls defining the compartments separated by the bulkhead structure. Two flanged sheet metal members joined mechanically or by bonding provide attachment flanges for joining the bulkhead and compartment walls, one flanged member being formed with corrugations which when joined to the other flanged member form a plurality of smooth conduits through the periphery of the bulkhead at the compartment walls for promoting air flow between compartments along the walls.

It is therefore a principal object of the invention to provide structure for facilitating flow of a fluid along a surface.

It is another object of the invention to provide novel structure for facilitating air flow in a de-icing system for aircraft.

It is another object of the invention to provide improved structure for de-icing the inlet cowl of an engine.

It is yet a further object of the invention to provide a novel de-icing system for the inlet cowl of an aircraft engine utilizing air heated by the engine.

These and other objects of the invention will become apparent as the detailed description of representative embodiments proceeds.

SUMMARY OF THE INVENTION

In accordance with the foregoing principles and objects of the invention, a bulkhead structure for separating two compartments in an aircraft engine inlet cowl or the like and for promoting fluid flow between the compartments is described which comprises a first flanged member having a first flange attached to the periphery of the bulkhead and a second flange having in one surface a plurality of corrugations extending across the width of the second flange, and a second flanged member having a first flange presenting a first surface for attachment to the walls defining the compartments separated by the bulkhead and presenting a second surface attached to the second flange of the first flanged member for defining with the corrugations a corresponding plurality of passageways past the bulkhead at the periphery thereof.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
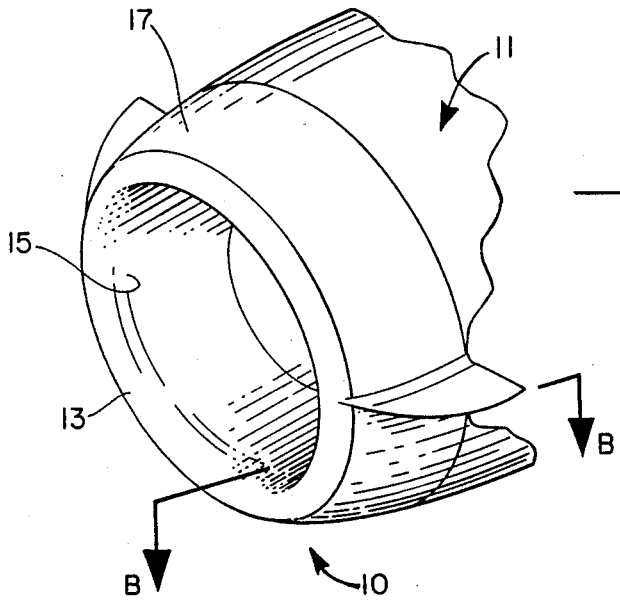
FIG. 1 shows an inlet cowl of an engine wherein the structure of the invention may typically be used.
Figure 2:
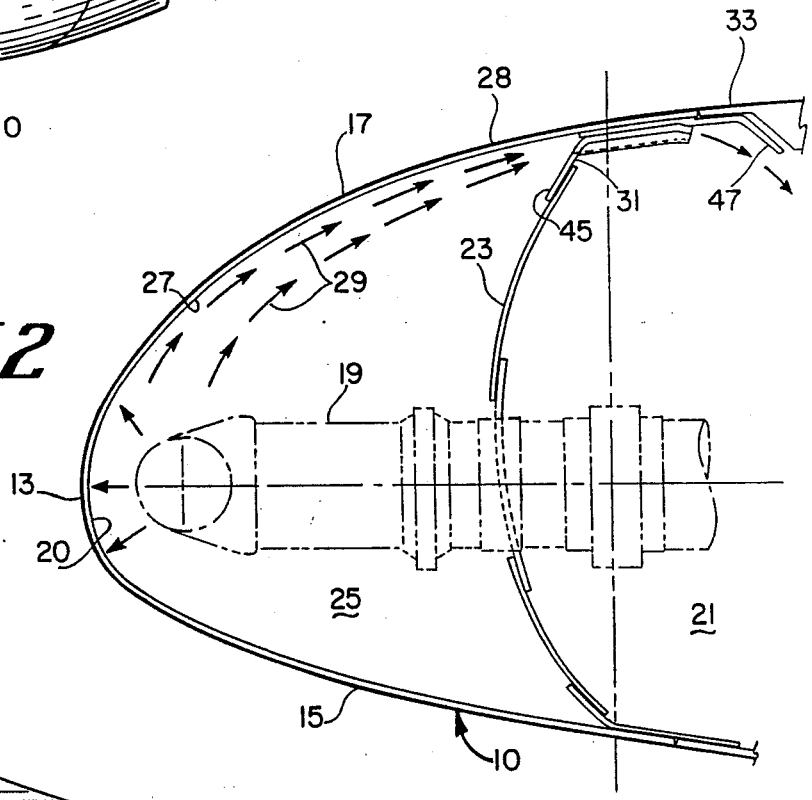
FIG. 2 is a view along line B—B of FIG. 1 showing a preferred placement of the structure of the invention in a bulkhead separating compartments in an aircraft structure, specifically in an engine cowl housing.

Referring now to the drawings, FIG. 1 shows a perspective view of an inlet cowl 10 of an engine 11 representative of aircraft compartments within which the fluid flow passage structure of the invention may typically be used as part of a de-icing system in the aircraft. Cowl 10 conventionally has a housing including a leading edge 13, an inner surface 15 defining an air inlet for engine 11, and an outer surface 17 faired to the housing of engine 11 to define a smooth outer aerodynamic surface for the aircraft. Surface 17 typically presents a surface susceptible to the accumulation of ice the removal of which is an object of any de-icing system included within the structure of cowl 10. Referring now additionally to FIG. 2, a view along line B—B of FIG. 1 is presented showing schematically the inner structure of cowl 10 including a representative placement locus for the flow passage structure of the invention. In the operation of the aircraft powered by engine 11, air heated in engine 11 may be conducted through valved flow controllable conduit means 19 and directed against inner surface 20 of leading edge 13 of cowl 10 within compartment 25 defined therewithin. Bulkhead 23 is representative of wall elements separating compartments in aircraft construction, and is illustrated in FIG. 2 as separating compartment 25 from rearwardly disposed compartment 21 which may enclose engine 11. Bulkhead 23 may be constructed to promote flow of hot air from conduit 19 along inner surface 27 of wall 28 defining compartment 25 and supporting outer surface 17 of cowl 10, the air flow along surface 27 being represented in FIG. 2 by arrows 29. Accordingly, the flow along surface 27 is rearward through openings in the radially outward edge 31 of bulkhead 23 near the juncture of wall 28 with wall 33 defining compartment 21. The air is thereafter exhausted through ports (not shown) in an engine compartment wall aft of bulkhead 23.

Figure 3:
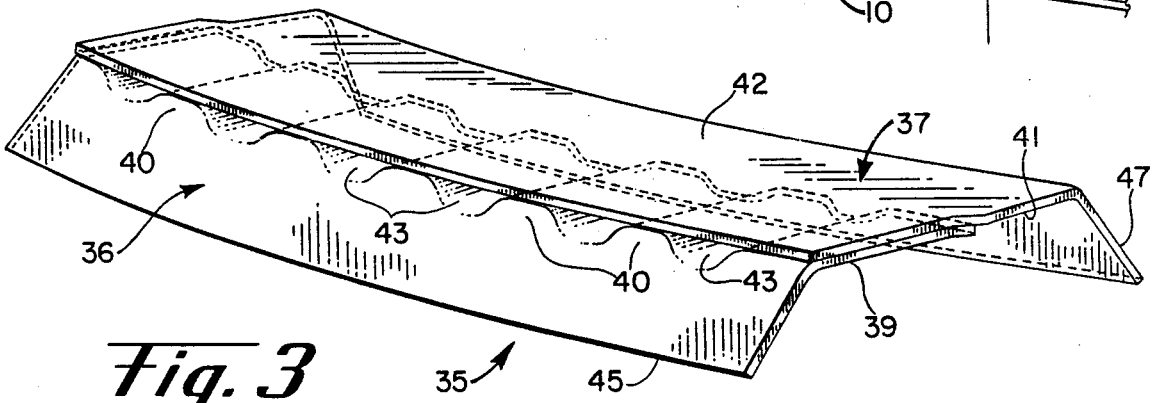
FIG. 3 is an enlarged view of a section of the structure of FIG. 2 showing a specific embodiment of the invention.

Referring now to FIG. 3, shown therein is a drawing of a section of the structure of device 35 of the invention which may be installed in the location designated 31 in FIG. 2. Device 35 may serve as a structural member for joining walls 28,33 and bulkhead 23 at 31 and may extend in the structural form shown any selected peripheral extent of bulkhead 23 in which it is desired to provide passageways for the flow of heated air along surface 27. Device 35 may therefore comprise substantially the same structural material and thickness which comprises walls 28,33 and/or bulkhead 23, which structural selections provide a particular advantage of not creating a differential thermal expansion problem such as characterizes prior art structures fabricated with machined grooves.

Device 35 comprises two annularly shaped flanged members 36,37 one of which (36 in FIG. 3) has formed in the surface of one flange 39 and along any preselected peripheral extent thereof a plurality of corrugations 40. Corresponding flanges 39,41 of respective members 36,37 are joined by mechanical fastening means, diffusion bonding, super plastic forming or other joining technique known in the applicable art considering the material selected for device 35 to form the structure suggested in FIG. 3. In joining of members 36,37 as just described in overlapping relationship of flanges 39, 41, passageways 43 are defined and formed in place between corresponding corrugations 40. Passageways 43 thus define the selected number of paths for air flow along surface 27 and past and through bulkhead 23 as suggested in FIG. 2 by arrows 29. The inwardly (as installed in position indicated at edge 31) depending flange 45 provides a surface for attaching bulkhead 23, and the outwardly facing surface 42 of flange 41 provides a surface for attaching walls 28,33. Inwardly depending flange 47 may provide a structural attachment member and a baffle defining a surface oblique to the direction of flow through passageways 43 for inwardly deflecting the flow of air rearwardly of bulkhead 23 (see FIG. 2) to prevent hot air from impinging directly upon the structural members behind bulkhead 23.

The structure taught herein therefore provides and improved de-icing structure for aircraft facilitating flow of heated air along an inner surface of wall structure to be de-iced and through a bulkhead between adjacent compartments. Since the structure of the invention comprises a plurality of passageways formed in place by the assembly of component parts. The structure may characteristically have higher strength-to-weight ratio than that of prior art structures, may avoid stress risers leading to structural fatigue problems associated with drilled, machined or punched structures configured for corresponding function, and may have a significantly lower associated cost of fabrication.

Although a principal function envisioned for the structure of the invention herein is in conducting air flow within a de-icing system of an aircraft as just described, it is noted that the invention may be applied to structures of other systems for facilitating flow of fluid through or past a barrier separating two chambers at preselected, substantially uniform flow rate. For example, the invention may be used in the structure of a bulkhead separating fuel tanks for control of fuel level in the tanks or as a drain structure for liquid containing tanks.

The invention therefore provides an improved structure for conducting fluid flow past a bulkhead separating compartments in an aircraft which may be particularly useful in a de-icing system in an aircraft. It is understood that modifications to the invention as described may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. In a bulkhead structure for separating two compartments said bulkhead including means for promoting fluid flow between said compartments, an improvement comprising:

(a) a first flanged member having a first flange presenting a surface for attachment to the periphery of said bulkhead, and a second flange having defined in a surface thereof a plurality of corrugations extending across the width of said second flange; and (b) a second flanged member having a first flange presenting a first surface for attachment to the walls defining first and second compartments separated by said bulkhead, and presenting a second surface for attachment to said second flange of said first flanged member and for defining with said plurality of corrugations a corresponding plurality of passageways through said bulkhead at the periphery thereof for promoting fluid flow between compartments separated by said bulkhead.

2. The structure of claim 1 further comprising a second flange on said second flanged member said second flange presenting a surface oblique to said second surface of said first flange of said second flanged member for deflecting flow of fluid passing between said compartments through said passageways.

3. An edge attachment structure for a bulkhead separating two compartments, comprising:

(a) a first flanged member having a first flange presenting a surface for attachment to the periphery of said bulkhead, and a second flange having defined in a surface thereof a plurality of corrugations extending across the width of said second flange; and (b) a second flanged member having a first flange presenting opposite first and second surfaces, said first surface for attachment to the walls defining first and second compartments separated by said bulkhead, said first flange attached at said second surface to said second flange of said first flanged member and defining with said plurality of corrugations a corresponding plurality of passageways through said structure for promoting fluid flow thereof.

4. The structure of claim 3 further comprising a second flange on said second flanged member, said second flange presenting a surface oblique to said second surface of said first flange of said second flanged member for deflecting flow of fluid passing between said compartments through said passageways.

* * * * *